(12) United States Patent
Xotta et al.

(10) Patent No.: US 11,842,078 B2
(45) Date of Patent: Dec. 12, 2023

(54) ASYNCHRONOUS INTERRUPT EVENT HANDLING IN MULTI-PLANE MEMORY DEVICES

(71) Applicant: Micron Technology, Inc., Boise, ID (US)

(72) Inventors: Andrea Giovanni Xotta, Avezzano (IT); Guido Luciano Rizzo, Avezzano (IT); Umberto Siciliani, Rubano (IT); Tommaso Vali, Avezzano (IT); Luca De Santis, Avezzano (IT); Walter Di Francesco, Avezzano (IT)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 17/589,080

(22) Filed: Jan. 31, 2022

(65) Prior Publication Data

US 2022/0405013 A1 Dec. 22, 2022

Related U.S. Application Data

(60) Provisional application No. 63/202,655, filed on Jun. 18, 2021.

(51) Int. Cl.
*G06F 12/00* (2006.01)
*G06F 3/06* (2006.01)
*G06F 9/48* (2006.01)

(52) U.S. Cl.
CPC .......... *G06F 3/0659* (2013.01); *G06F 3/0619* (2013.01); *G06F 3/0653* (2013.01); *G06F 3/0679* (2013.01); *G06F 9/4812* (2013.01)

(58) Field of Classification Search
CPC .... G06F 3/0659; G06F 3/0619; G06F 3/0653; G06F 3/0679; G06F 9/4812; G06F 3/061; G06F 12/0246
USPC ........................................................ 711/154
See application file for complete search history.

(56) References Cited

U.S. PATENT DOCUMENTS

2022/0391321 A1* 12/2022 Sankaranarayanan ......................
G06F 3/0656

FOREIGN PATENT DOCUMENTS

JP       2002536712 A  *  7/1994
WO   WO-2021113488 A1 *  6/2021  .......... G06F 11/1453

* cited by examiner

*Primary Examiner* — Mardochee Chery
(74) *Attorney, Agent, or Firm* — Lowenstein Sandler LLP

(57) ABSTRACT

A memory device includes a memory array configured with a plurality of memory planes, and control logic, operatively coupled with the memory array. The control logic performs a plurality of asynchronous memory access operations on the plurality of memory planes, detects an occurrence of an asynchronous interrupt event, and initiates a termination procedure for each of the plurality of asynchronous memory access operations to permit each of the plurality of asynchronous memory access operations to end at different times. In response to a first memory access operation of the plurality of asynchronous memory access operations ending, the control logic asserts a command result signal, wherein the command result signal is de-asserted automatically in response to receipt of a subsequent memory access command directed to any of the plurality of memory planes, and asserts a persistent event register signal, wherein the command result signal is de-asserted in response to receipt of a clear event register command.

20 Claims, 7 Drawing Sheets

ASYNCHRONOUS INTERRUPT EVENT HANDLING IN MULTI-PLANE MEMORY DEVICES

RELATED APPLICATION

This application claims the benefit of U.S. Provisional Patent Application Ser. No. 63/202,655, filed Jun. 18, 2021, the entire contents of which is hereby incorporated by reference herein.

TECHNICAL FIELD

Embodiments of the disclosure relate generally to memory sub-systems, and more specifically, relate to asynchronous interrupt event handling in multi-plane memory devices in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
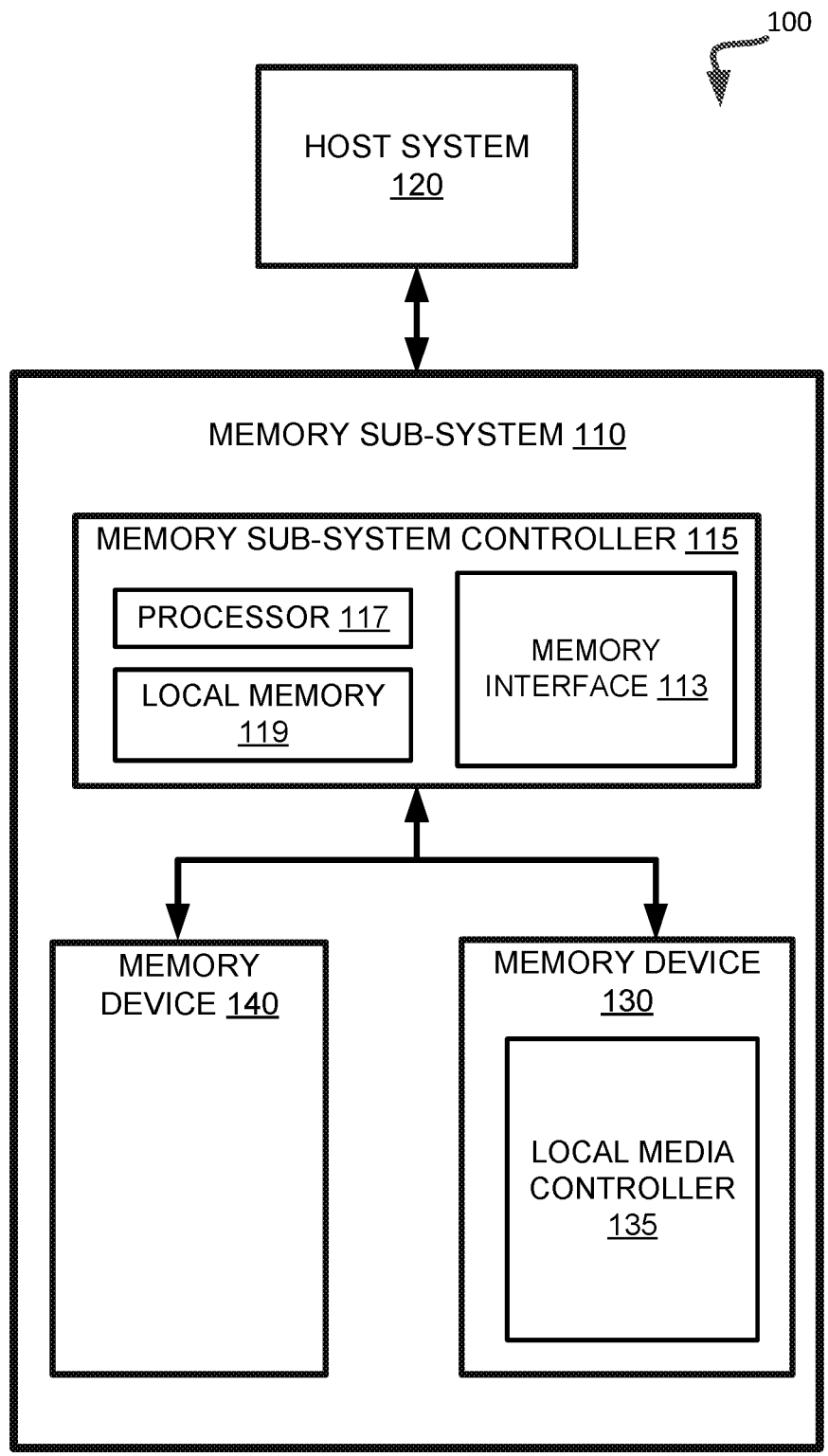
FIG. 1 illustrates an example computing system that includes a memory sub-system in accordance with some embodiments of the present disclosure.

Aspects of the present disclosure are directed to asynchronous interrupt event handling in multi-plane memory devices in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

The use of the independent plane driver circuits permits parallel and asynchronous memory access operations (e.g., read operations) to be performed on different partitions (e.g., planes) of the memory device. By their nature, these independent operations can begin and end at different times. For example, a local media controller within the memory device can include separate control logic (e.g., a state machine executing a respective processing thread) associated with each partition. Furthermore, the local media controller can include a command interface having a number of status registers, where each status register can store a value representing a current state of a respective state machine associated with one of the partitions of the memory device. The value in each status register can be used to either assert or not assert a respective status signal (e.g., a ready/busy signal) indicating whether the control logic is actively performing a memory operation on each of the separate partitions. In addition to the separate status registers and associated status signals, the memory device can also include a die-level status register storing a value representing whether any of the state machines are active, which can be used to assert or not assert a die-level status signal.

During operation of such a multi-plane memory device, asynchronous interrupt events can periodically occur. For example, a memory sub-system controller or host system could issue a reset command to the memory device, the memory device could experience a sudden drop in the voltage supply level, etc. Depending on the mode of operation, the memory device can be executing multiple operations on respective partitions asynchronously. In such a situation, a protocol is needed whereby the control logic can process an asynchronous interrupt event to cause the multiple processing threads executing asynchronously to return to a synchronous reset state and to notify a memory sub-system controller or host system utilizing the memory device of the interrupt handling such that subsequent memory access operations can be performed.

Aspects of the present disclosure address the above and other issues by performing asynchronous interrupt event handling in multi-plane memory devices in a memory sub-system. In one embodiment, control logic of the memory device performs a plurality of asynchronous memory access operations on the plurality of memory planes and detects an occurrence of an asynchronous interrupt event. In response, the control logic can initiate a termination procedure for each of the plurality of asynchronous memory access operations. Such a procedure can permit each of the plurality of asynchronous memory access operations to end at different times. Once a first memory access operation of the plurality of asynchronous memory access operations ends (i.e., in response to a respective termination procedure), the control logic asserts a command result signal indicating that the plurality of asynchronous memory access operations were interrupted by the asynchronous interrupt event. Such a command result signal is de-asserted automatically in response to receipt of a subsequent memory access command directed to any of the plurality of memory planes. At the same time, the control logic can also assert a persistent event register signal to notify a recipient (e.g., at least one of a memory sub-system controller or a host system) that the memory device has recovered from the occurrence of the asynchronous interrupt event and that the plurality of asynchronous memory access operations were terminated. Such a command result signal is de-asserted only in response to receipt of a clear event register command. By forcing the sending of the clear event register command, the control logic will cause the memory sub-system controller or host system to recognize that any data received in response to the previous commands (i.e., the commands that were interrupted) on all of the memory planes is unreliable, and that those commands should potentially be re-issued.

Advantages of this approach include, but are not limited to, improved performance of the memory device. In the manner described herein, multiple independent and asynchronous memory access operations can be safely terminated in the case of an interrupt event. The state machine/processing thread associated with each partition of the memory device can reach a known synchronous ready state while ensure that an external processing device (e.g., a memory sub-system controller or host system) is notified of the termination of the memory access operations and recovery from the interrupt event. Such objectives are achieved while satisfying existing legacy protocols including providing a die-level status signal which indicates that the memory device is ready once the respective asynchronous memory access operations have been closed and all partitions are ready to accept new commands, as well as an operation status signal corresponding to the latest issued command. The persistent clear event register signal reduces or eliminates the risk of the requestor missing the assertion of the command result signal due to thread parallelism, which improves reliability of data read from the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface, Open NAND Flash Interface (ONFI)

interface, or some other interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. In some embodiments, the memory sub-system controller 115 includes at least a portion of the memory interface 113. For example, the memory sub-system controller 115 can include a processor 117 (e.g., a processing device) configured to execute instructions stored in local memory 119 for performing the operations described herein. In some embodiments, the memory interface component 113 is part of the host system 110, an application, or an operating system.

In one embodiment, memory device 130 includes local media controller 135 which is configured to handle asynchronous interrupt events, including reset commands received from memory interface 113 or the sudden loss of power to memory device 130 and/or memory sub-system 110. As described in more detail below, local media controller can detect an occurrence of an asynchronous interrupt event during a time when multiple state machines/processing threads are performing a plurality of asynchronous memory access operations on memory device 130 (e.g., a separate memory access operation on each of multiple memory planes of memory device 130). In response to the interrupt event, local media controller 135 can initiate a termination procedure to permit each of the plurality of asynchronous memory access operations to end at different times. This can include causing a respective state machine associated with a respective memory plane to enter one or more states to terminate a corresponding asynchronous memory access operation being performed on that memory plane. A similar process can be performed for the memory operations being performed on each of the remaining planes, until all have been terminated. Once a first memory access operation ends (i.e., in response to a respective termination procedure), local media controller 135 can assert a command result signal indicating to memory interface 113 that the plurality of asynchronous memory access operations were interrupted by the asynchronous interrupt event. At the same time, local media controller 135 can also assert a persistent event register signal to notify memory interface 113 that the memory device 130 has recovered from the occurrence of the asynchronous interrupt event and that the plurality of asynchronous memory access operations were terminated. Such a command result signal is de-asserted only in response to receipt of a clear event register command from memory interface 113. Further details with regards to the operations of local media controller 135 are described below.

Figure 2:
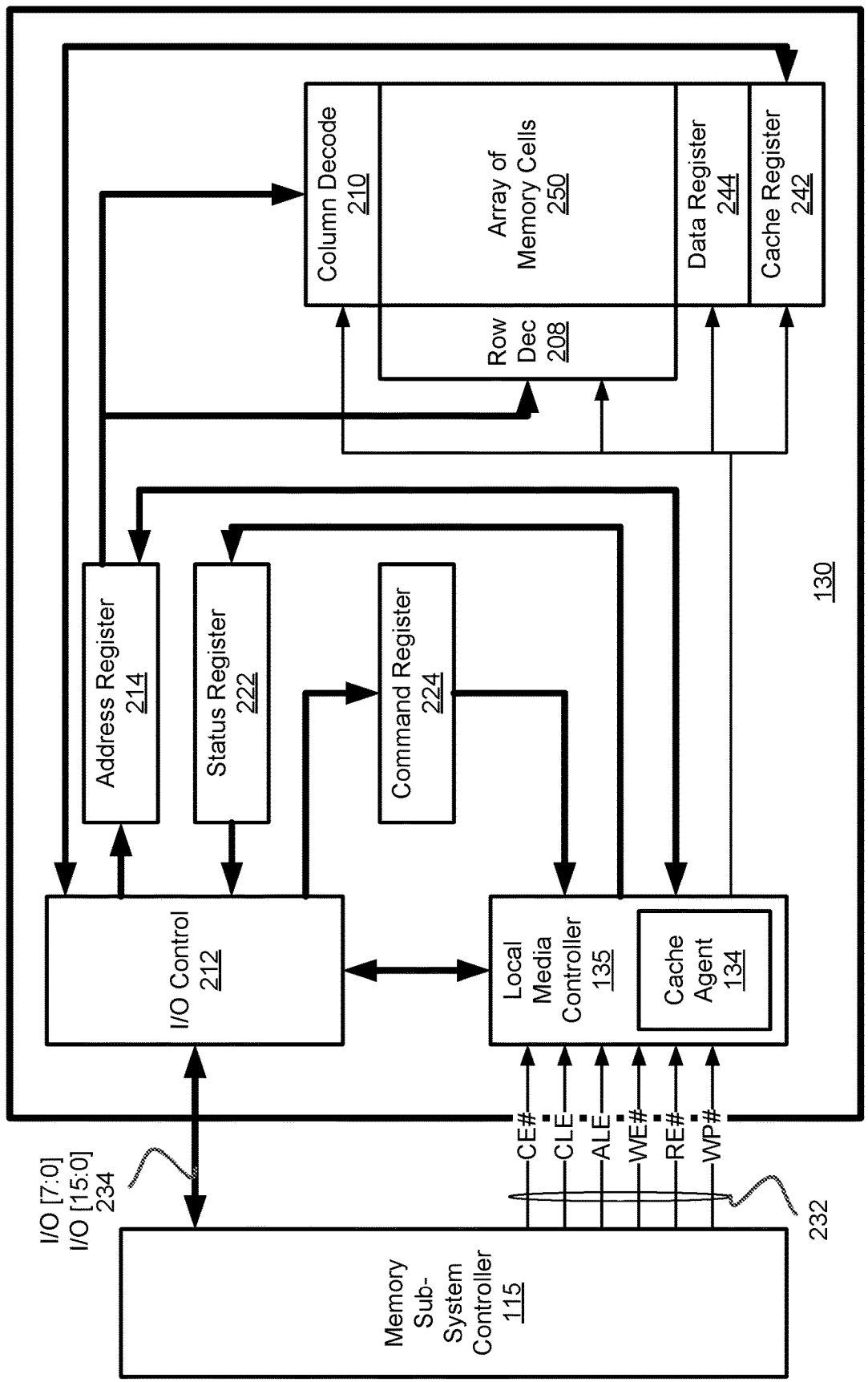
FIG. 2 is a block diagram of a memory device in communication with a memory sub-system controller of a memory sub-system, according to an embodiment.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 250 logically arranged in rows and columns. Memory cells of a logical row are typically connected to the same access line (e.g., a word line) while memory cells of a logical column are typically selectively connected to the same data line (e.g., a bit line). A single access line may be associated with more than one logical row of memory cells and a single data line may be associated with more than one logical column. Memory cells (not shown in FIG. 2) of at least a portion of array of memory cells 250 are capable of being programmed to one of at least two target data states.

Row decode circuitry 208 and column decode circuitry 210 are provided to decode address signals. Address signals are received and decoded to access the array of memory cells 250. Memory device 130 also includes input/output (I/O) control circuitry 212 to manage input of commands, addresses and data to the memory device 130 as well as output of data and status information from the memory device 130. An address register 214 is in communication with I/O control circuitry 212 and row decode circuitry 208 and column decode circuitry 210 to latch the address signals prior to decoding. A command register 224 is in communication with I/O control circuitry 212 and local media controller 135 to latch incoming commands.

A controller (e.g., the local media controller 135 internal to the memory device 130) controls access to the array of memory cells 250 in response to the commands and generates status information for the external memory sub-system controller 115, i.e., the local media controller 135 is configured to perform access operations (e.g., read operations, programming operations and/or erase operations) on the array of memory cells 250. The local media controller 135 is in communication with row decode circuitry 208 and column decode circuitry 210 to control the row decode circuitry 208 and column decode circuitry 210 in response to the addresses. In one embodiment, local media controller 135 includes cache agent 134, which can implement the cache read context switching of memory device 130, as described herein.

The local media controller 135 is also in communication with a cache register 242. Cache register 242 latches data, either incoming or outgoing, as directed by the local media controller 135 to temporarily store data while the array of memory cells 250 is busy writing or reading, respectively, other data. During a program operation (e.g., write operation), data may be passed from the cache register 242 to the data register 244 for transfer to the array of memory cells 250; then new data may be latched in the cache register 242 from the I/O control circuitry 212.

During a read operation, data may be passed from the cache register 242 to the I/O control circuitry 212 for output to the memory sub-system controller 115; then new data may be passed from the data register 244 to the cache register 242. The cache register 242 and/or the data register 244 may form (e.g., may form a portion of) a page buffer of the memory device 130. A page buffer may further include sensing devices (not shown in FIG. 2) to sense a data state of a memory cell of the array of memory cells 250, e.g., by sensing a state of a data line connected to that memory cell. A status register 222 may be in communication with I/O control circuitry 212 and the local memory controller 135 to latch the status information for output to the memory sub-system controller 115. As described herein, memory device 130 can include multiple status registers, including separate status registers associated with each respective partition (e.g., plane) of memory device 130, as well as a die-level status register for memory device 130.

Memory device 130 receives control signals at the memory sub-system controller 115 from the local media controller 135 over a control link 232. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 232 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 234 and outputs data to the memory sub-system controller 115 over I/O bus 234.

For example, the commands may be received over input/output (I/O) pins [7:0] of I/O bus 234 at I/O control circuitry 212 and may then be written into command register 224. The addresses may be received over input/output (I/O) pins [7:0] of I/O bus 234 at I/O control circuitry 212 and may then be written into address register 214. The data may be received over input/output (I/O) pins [7:0] for an 8-bit device or input/output (I/O) pins [15:0] for a 16-bit device at I/O control circuitry 212 and then may be written into cache register 242. The data may be subsequently written into data register 244 for programming the array of memory cells 250.

In an embodiment, cache register 242 may be omitted, and the data may be written directly into data register 244. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 2 has been simplified. It should be recognized that the functionality of the various block components described with reference to FIG. 2 may not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) may be used in the various embodiments.

Figure 3:
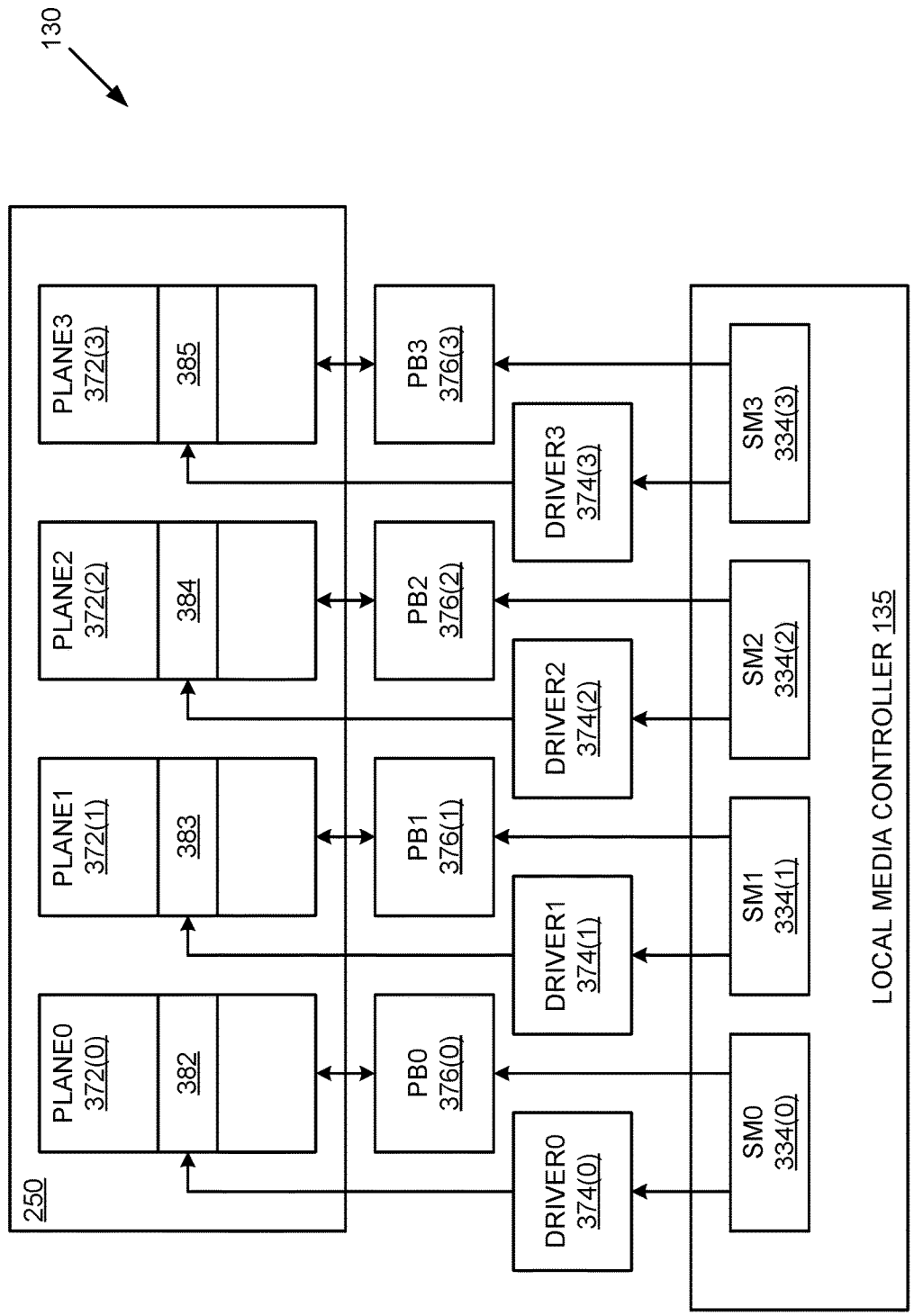
FIG. 3 is a block diagram illustrating a multi-plane memory device configured for parallel plane access in accordance with some embodiments of the present disclosure.

FIG. 3 is a block diagram illustrating a multi-plane memory device 130 configured for independent parallel plane access in accordance with some embodiments of the present disclosure. In one embodiment, the memory array 250 of memory device 130 is divided into a number of separate partitions, such as memory planes 372(0)-372(3) that each includes a respective number of memory cells. The memory planes 372(0)-372(3) can each be divided into blocks of data, with a different relative block of data from two or more of the memory planes 372(0)-372(3) concurrently accessible during memory access operations. For example, during memory access operations, two or more of data block 382 of the memory plane 372(0), data block 383 of the memory plane 372(1), data block 384 of the memory plane 372(2), and data block 385 of the memory plane 372(3) can each be accessed concurrently. The multi-plane memory device 130 can further include local media controller 135, including a power control circuit and access control circuit for concurrently performing memory access operations for different memory planes 372(0)-372(3). The memory cells can be non-volatile memory cells, such as NAND flash cells, or can generally be any type of memory cells.

In one embodiment, each of the memory planes 372(0)-372(3) is coupled to a respective page buffer 376(0)-376(3). Each page buffer 376(0)-376(3) can be configured to provide data to or receive data from the respective memory plane 372(0)-372(3). The page buffers 376(0)-376(3) can be controlled by local media controller 135. Data received from the respective memory plane 372(0)-372(3) can be latched at the page buffers 376(0)-376(3), respectively, and retrieved by local media controller 135, and provided to the memory sub-system controller 115 via an ONFI interface, for example.

Each of the memory planes 372(0)-372(3) can be further coupled to a respective access driver circuit 374(0)-374(3), such as an access line driver circuit. The driver circuits 374(0)-374(3) can be configured to condition a page of a respective block of an associated memory plane 372(0)-372(3) for a memory access operation, such as programming data (i.e., writing data), reading data, or erasing data. Each of the driver circuits 374(0)-374(3) can be coupled to a respective global access lines associated with a respective memory plane 372(0)-372(3). Each of the global access lines can be selectively coupled to respective local access lines within a block of a plane during a memory access operation associated with a page within the block. The driver circuits 374(0)-374(3) can be controlled based on signals from local media controller 135. Each of the driver circuits 374(0)-374(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 374(0)-374(3) and page buffers 376(0)-376(3) to concurrently perform memory access operations associated with each of a group of memory command and address pairs (e.g., received from memory sub-system controller 115). For example, local media controller 135 can control the driver circuits 374(0)-374(3) and page buffer 376(0)-376(3) to perform the concurrent memory access operations. Local media controller 135 can include a power control circuit that serially configures two or more of the driver circuits 374(0)-374(3) for the concurrent memory access operations, and an access control circuit configured to control two or more of the page buffers 376(0)-376(3) to sense and latch data from the respective memory planes 372(0)-372(3), or program data to the respective memory planes 372(0)-372(3) to perform the concurrent memory access operations.

In operation, local media controller 135 can receive a group of memory command and address pairs via the ONFI bus, with each pair arriving in parallel or serially. In some examples, the group of memory command and address pairs can each be associated with different respective memory planes 372(0)-372(3) of the memory array 250. The local media controller 135 can be configured to perform concurrent memory access operations (e.g., read operations or program operations) for the different memory planes 372(0)-372(3) of the memory array 250 responsive to the group of memory command and address pairs. For example, the power control circuit of local media controller 135 can serially configure, for the concurrent memory access operations based on respective page type (e.g., UP, MP, LP, XP, SLC/MLC/TLC/QLC page), the driver circuits 374(0)-374(3) for two or more memory planes 372(0)-372(3) associated with the group of memory command and address pairs. After the access line driver circuits 374(0)-374(3) have been configured, the access control circuit of local media controller 135 can concurrently control the page buffers 376(0)-376(3) to access the respective pages of each of the two or more memory planes 372(0)-372(3) associated with the group of memory command and address pairs, such as retrieving data or writing data, during the concurrent memory access operations. For example, the access control circuit can concurrently (e.g., in parallel and/or contemporaneously) control the page buffers 376(0)-376(3) to charge/discharge bitlines, sense data from the two or more memory planes 372(0)-372(3), and/or latch the data.

Based on the signals received from local media controller 135, the driver circuits 374(0)-374(3) that are coupled to the memory planes 372(0)-372(3) associated with the group of memory command and address command pairs can select blocks of memory or memory cells from the associated memory plane 372(0)-372(3), for memory operations, such as read, program, and/or erase operations. The driver circuits 374(0)-374(3) can drive different respective global access lines associated with a respective memory plane 372(0)-372(3). As an example, the driver circuit 374(0) can drive a first voltage on a first global access line associated with the memory plane 372(0), the driver circuit 374(1) can drive a second voltage on a third global access line associated with the memory plane 372(1), the driver circuit 374(2) can drive a third voltage on a seventh global access line associated with the memory plane 372(2), etc., and other voltages can be driven on each of the remaining global access lines. In some examples, pass voltages can be provided on all access lines except an access line associated with a page of a memory plane 372(0)-372(3) to be accessed. The local media controller 135, the driver circuits 374(0)-374(3) can allow different respective pages, and the page buffers 376(0)-376(3) within different respective blocks of memory cells, to be accessed concurrently. For example, a first page of a first block of a first memory plane can be accessed concurrently with a second page of a second block of a second memory plane, regardless of page type.

The page buffers 376(0)-376(3) can provide data to or receive data from the local media controller 135 during the memory access operations responsive to signals from the local media controller 135 and the respective memory planes 372(0)-372(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 374(0)-374(3) can concurrently access different respective pages within different respective blocks of different memory planes when the different respective pages are of a different page type. For example, local media controller 135 can include a number of different processing threads, such as state machines (SMs) 334(0)-334(3), each executing a respective processing thread. Each of state machines 334(0)-334(3) can be associated with a respective one of memory planes 372(0)-372(3) and can manage operations performed on the respective plane. For example, each of state machines 334(0)-334(3) can provide control signals to the respective one of driver circuits 374(0)-374(3) and page buffers 376(0)-376(3) to perform those memory access operations concurrently (e.g., at least partially overlapping in time).

Figure 4:
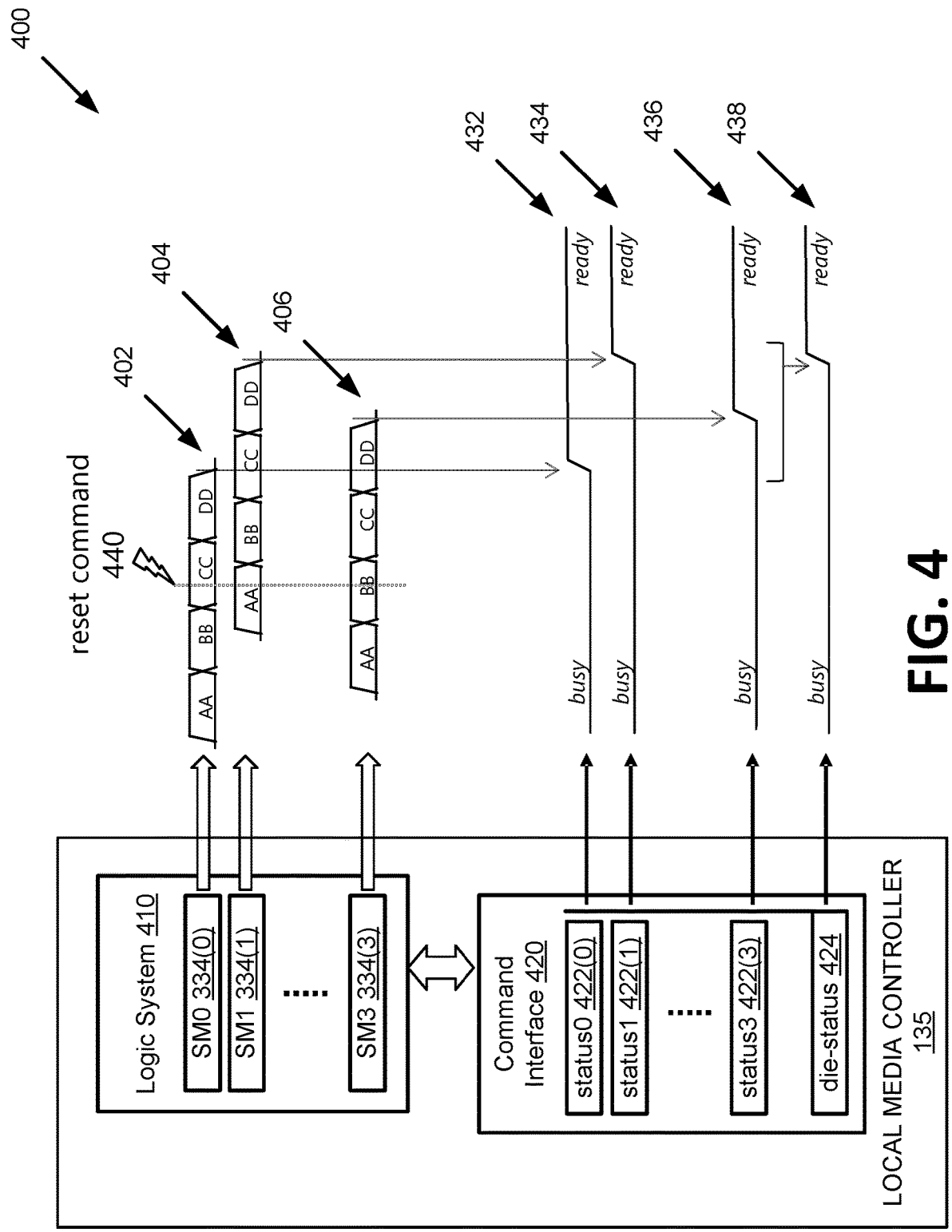
FIG. 4 is a timing diagram illustrating asynchronous memory access operation processing in a multi-plane memory device in accordance with some embodiments of the present disclosure.

FIG. 4 is a timing diagram illustrating asynchronous memory access operation processing in a multi-plane memory device in accordance with some embodiments of the present disclosure. Diagram 400 illustrates local media controller 135, which includes logic system 410 and command interface 420. In one embodiment, logic system 410 includes a number of state machines 334(0)-334(3) each executing a respective processing thread associated with a given partition (e.g., plane) of memory device 130. For example, state machine 334(0) can execute a memory access operation including a number of states 402 on a certain plane (e.g., memory plane 372(0)). Similarly, state machine 334(1) can execute a memory access operation including a number of states 404 on a certain plane (e.g., memory plane 372(1)), and state machine 334(3) can execute a memory access operation including a number of states 406 on a certain plane (e.g., memory plane 372(3)). Since these memory access operations are independent and asynchronous, they can begin and end at different times.

In one embodiment, command interface 420 includes a number of status registers, where each status register can store a value representing a current state of a respective state machine associated with one of the partitions of the memory device. For example, status register 422(0) can be associated with state machine 334(0), status register 422(1) can be associated with state machine 334(1), and status register 422(3) can be associated with state machine 334(3). Each status register can store a value which can be used to either assert or not assert a respective status signal (e.g., a ready/busy signal) indicating whether the associated state machine is actively performing a memory operation on a respective one of the separate partitions. For example, partition status signal 432 indicates a status of state machine 334(0) based on the value stored in status register 422(0), partition status signal 434 indicates a status of state machine 334(1) based on the value stored in status register 422(1), and partition status signal 436 indicates a status of state machine 334(3) based on the value stored in status register 422(3). In addition to the separate status registers and associated status signals, command interface 420 can also include a die-level status register 424 storing a value representing whether any of the state machines in logic system 410 are active, and which can be used to assert or not assert a die-level status signal 438.

In one embodiment, during operation of multi-plane memory device 130, asynchronous interrupt events can periodically occur. For example, a memory sub-system controller or host system could issue a reset command 440 to the memory device. In one mode of operation, logic system 410 can be executing multiple operations on respective partitions asynchronously. In response, logic system 410 can initiate a termination procedure for each of the plurality of asynchronous memory access operations. Such a procedure can permit each of the plurality of asynchronous memory access operations to end at different times, depending on a state of the memory access operation at a time when reset command 440 is received. In one embodiment, logic system 410 can cause each state machine to enter one or more states to terminate a corresponding memory access operation being performed. For example, state "DD" can mark the termination of a memory access command, where state "DD" is preceded by any number of other states (e.g., "CC", "BB", etc.) Thus, state machine 334(0) can reach state DD 402 at a first time after reset command 440 is received, state machine 334(3) can reach state DD 406 at a second time after reset command 440 is received, and state machine 334(1) can reach state DD 404 at a third time after reset command 440 is received.

In one embodiment, each of status signals 432, 434, and 436 are in a "busy" state (e.g., a low state or de-asserted) when respective memory access operations are being performed. When those memory access operations are terminated (e.g., in response to receipt of reset command 440), the corresponding status signals can be transitioned to a "ready" state (e.g., a high state or asserted). For example, status signal 432 can be asserted at the first time when state machine 334(0) reaches state DD 402, status signal 436 can be asserted as the second time when state machine 334(3) reaches state DD 406, and status signal 434 can be asserted at the third time when state machine 334(1) reaches state DD 404.

Figure 5:
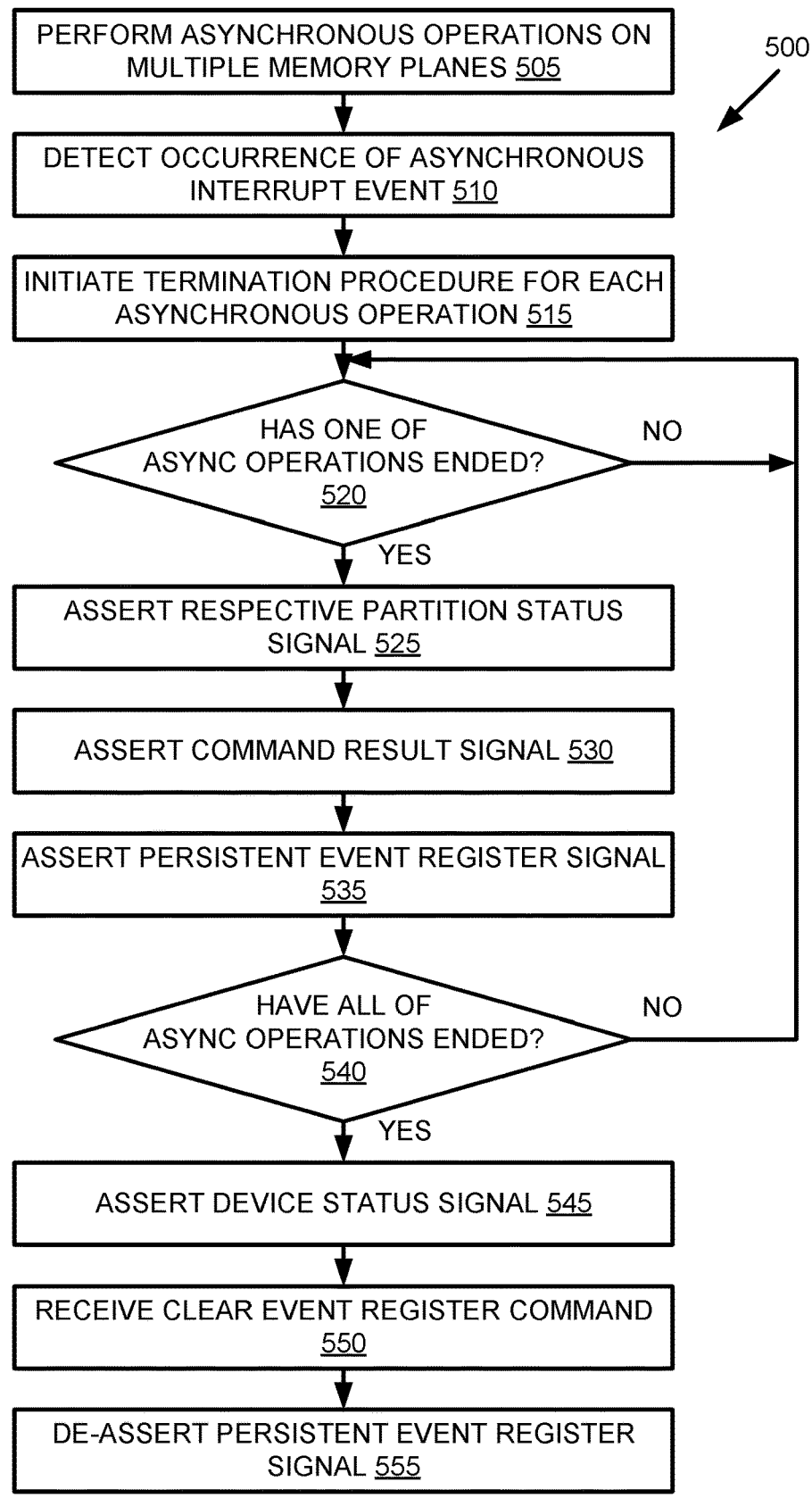
FIG. 5 is a flow diagram of an example method of asynchronous interrupt event handling in multi-plane memory devices in accordance with some embodiments of the present disclosure.

FIG. 5 is a flow diagram of an example method of asynchronous interrupt event handling in multi-plane memory devices in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by local media controller 135 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, memory access operations are performed. For example, processing logic (e.g., local media controller 135) can perform a plurality of asynchronous memory access operations on a plurality of memory planes, or other partitions, of memory device 130. In one embodiment, respective state machines, such as state machines 334(0)-334(3) of a logic system 410 within local media controller 135 each perform an asynchronous memory access operation (e.g., read operation) on a respective one of the plurality of memory planes concurrently (i.e., at least partially overlapping in time).

At operation 510, an interrupt event occurs. For example, the processing logic can detect an occurrence of an asynchronous interrupt event. Depending on the embodiment, local media controller 135 can detect the occurrence of the asynchronous interrupt event by receiving a reset command from the at least one of memory sub-system controller 115 or host system 120, by detecting a drop in a voltage supply level of the memory device 130, or in some other manner. In one embodiment, the detecting of the occurrence of the asynchronous interrupt event at operation 510 can occur while the plurality of asynchronous memory access operations are being performed at operation 505.

At operation 515, memory access operations are terminated. For example, the processing logic can initiate a termination procedure for each of the plurality of asynchronous memory access operations to permit each of the plurality of asynchronous memory access operations to end at different times. In one embodiment, local media controller 135 can cause a respective state machine associated with a respective one of the plurality of memory planes to enter one or more states to terminate a corresponding one of the plurality of asynchronous memory access operations being performed on the respective one of the plurality of memory planes. For example, responsive to receiving reset command 440, local media controller 135 can cause state machine 334(0), which was in state "CC" when reset command 440 is received, to switch to state "DD" 402 and then terminate. In one embodiment, the initiating of the termination procedure at operation 515 can occur in response to the detecting of the occurrence of the asynchronous interrupt event at operation 510.

At operation 520, a determination is made. For example, the processing logic can determine whether at least one (e.g., a first) memory access operation of the plurality of asynchronous memory access operations has ended (e.g., been terminated). To make such a determination, local media controller 135 can examine the respective status registers of command interface 420 which are set to a specific value upon termination of a corresponding operation (e.g., the corresponding state machine reaching state "DD"). The presence of the specific value in a given status register will indicate that the operation being performed on the corresponding partition has ended.

At operation 525, a status signal is asserted. For example, in response to determining that at least one of the plurality of asynchronous memory access operations has ended, the processing logic can assert a respective partition status signal indicating that a corresponding one of the plurality of memory planes is ready and able to accept a subsequent memory access command. For example, upon determining that state machine 334(0) has terminated the associated memory access operation, local media controller can assert partition status signal 432. Similarly, upon termination of each memory access operation, a corresponding partition status signal can be asserted.

At operation 530, a command result signal is asserted. For example, the processing logic can assert a command result signal, wherein the command result signal is de-asserted automatically in response to receipt of a subsequent memory access command directed to any of the plurality of memory planes.

Figure 6:
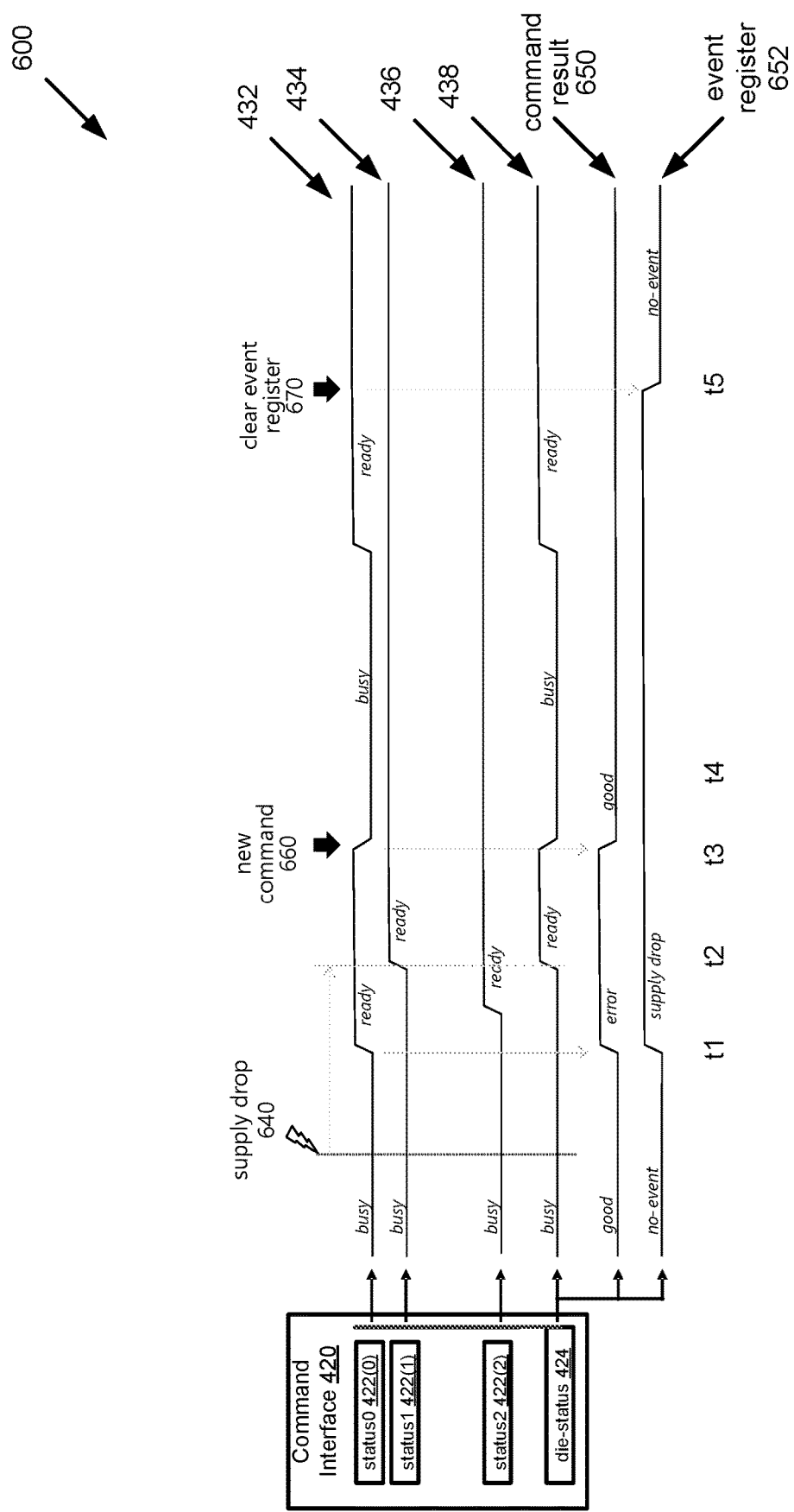
FIG. 6 is a timing diagram illustrating asynchronous interrupt event handling in a multi-plane memory device in accordance with some embodiments of the present disclosure.

FIG. 6 is a timing diagram illustrating asynchronous interrupt event handling in a multi-plane memory device in accordance with some embodiments of the present disclosure. Diagram 600 illustrates command interface 420 of local media controller 135 which includes a number of status registers, where each status register can store a value representing a current state of a respective state machine associated with one of the partitions of the memory device 130. As described above, when local media controller 135 detects the occurrence of an interrupt event, such as a drop in the voltage supply 640, the local media controller can initiate a termination procedure for each of the plurality of asynchronous memory access operations, and assert respective status signals, such as 432, 434, 436, and 438. In response to determining that at least one of the plurality of asynchronous memory access operations has ended, local media controller can assert a command result signal 650. In one embodiment, command result signal 650 is in a "good" state (e.g., a low state or de-asserted) when memory access operations are being performed. At a first time (t1) when a first memory access command is terminated and a first partition status signal 432 is asserted, the command result signal 650 can be transitioned to an "error" state (e.g., a high state or asserted). In one embodiment, the command result signal 650 is asserted based on a value stored in a device status register 424 representing a state of the plurality of asynchronous memory access operations on each of the plurality of memory planes. In one embodiment, the command result signal 650 is provided to at least one of a memory sub-system controller 115 or a host system 120 coupled to the memory device 130. The command result signal 650 remains asserted at a second time (t2) when all of the asynchronous memory access operations have ended and is de-asserted automatically at a third time (t3) when a subsequent memory access command 660 directed to any of the plurality of memory planes is received.

Referring again to FIG. 5, at operation 535, a persistent event register signal is asserted. For example, the processing logic can assert a persistent event register signal, wherein the command result signal is de-asserted in response to receipt of a clear event register command. The persistent event register signal is to notify the at least one of the memory sub-system controller 115 or the host system 120 that the memory device 130 has recovered from the occurrence of the asynchronous interrupt event (e.g., supply drop 640) and that the plurality of asynchronous memory access operations were terminated.

Referring again to FIG. 6, in response to determining that at least one of the plurality of asynchronous memory access operations has ended, local media controller can assert persistent event register signal 652. In one embodiment, event register signal 652 is in a "no-event" state (e.g., a low state or de-asserted) when memory access operations are being performed. At the first time (t1) when the first memory access command is terminated and the first partition status signal 432 is asserted, the event register signal 652 can be transitioned to a "supply drop" state (e.g., a high state or asserted). In one embodiment, the event register signal 652 is asserted based on a value stored in a device status register 424 representing a state of the plurality of asynchronous memory access operations on each of the plurality of memory planes. In one embodiment, the event register signal 652 is provided to at least one of memory sub-system controller 115 or host system 120 coupled to the memory device 130. The command result signal 650 remains asserted at the second time (t2) when all of the asynchronous memory access operations have ended and at the third time (t3) when a subsequent memory access command 660 directed to any of the plurality of memory planes is received.

Referring again to FIG. 5, at operation 540, a determination is made. For example, the processing logic can determine whether all of the plurality of asynchronous memory access operations have ended (e.g., been terminated). To make such a determination, local media controller 135 can examine the respective status registers of command interface 420 which are set to a specific value upon termination of a corresponding operation (e.g., the corresponding state machine reaching state "DD"). The presence of the specific value in each status register will indicate that the operations being performed on the corresponding partitions have ended.

At operation 545, a device status signal is asserted. For example, at a second time (t2) in response to determining that all of the plurality of asynchronous memory access operations have ended, the processing logic can assert a device status signal 438 indicating that the all of the plurality of memory planes are ready and able to accept subsequent memory access commands. The device status signal 438 remains asserted until a third time (t3) when a subsequent memory access command 660 directed to any of the plurality of memory planes is received.

At operation 550, a clear event register command is received. For example, the processing logic can receive the clear event register command 670 from memory sub-system controller 115 or host system 120. In one embodiment, the clear event register command 670 is received at a fifth time (t5).

At operation 555, the persistent event register signal is de-asserted. For example, the processing logic can de-assert the persistent event register signal 652. In one embodiment, local media controller 135 can transition the event register signal 652 to the "no-event" state (e.g., a low state or de-asserted) in response to receiving the clear event register command 670.

When a requestor, such as memory sub-system controller 115 or host system 120, issues a new memory access command 660 at the third time (t3), the requestor can read the command result signal 650 and detect that the command result signal 650 is asserted (i.e., in the "error" state). This indicates that any data received from the previous command executed on the respective plane is potentially unreliable since the previous command was interrupted by asynchronous interrupt event 640. Since command result signal 650 is de-asserted automatically in response to the receipt of new command 660, if any additional commands received subsequently (e.g., at a fourth time (t4)) the command result signal 650 would no longer be asserted. Accordingly, the requestor would not recognize that any data received from the previous commands on the other planes of memory device 130 is unreliable. By requiring the requestor to send the clear event register command 670 when the event register signal 652 is asserted, the requestor can recognize that the data from the previous commands on all of the planes of memory device 130 is unreliable, and that those commands would need to be re-issued.

Figure 7:
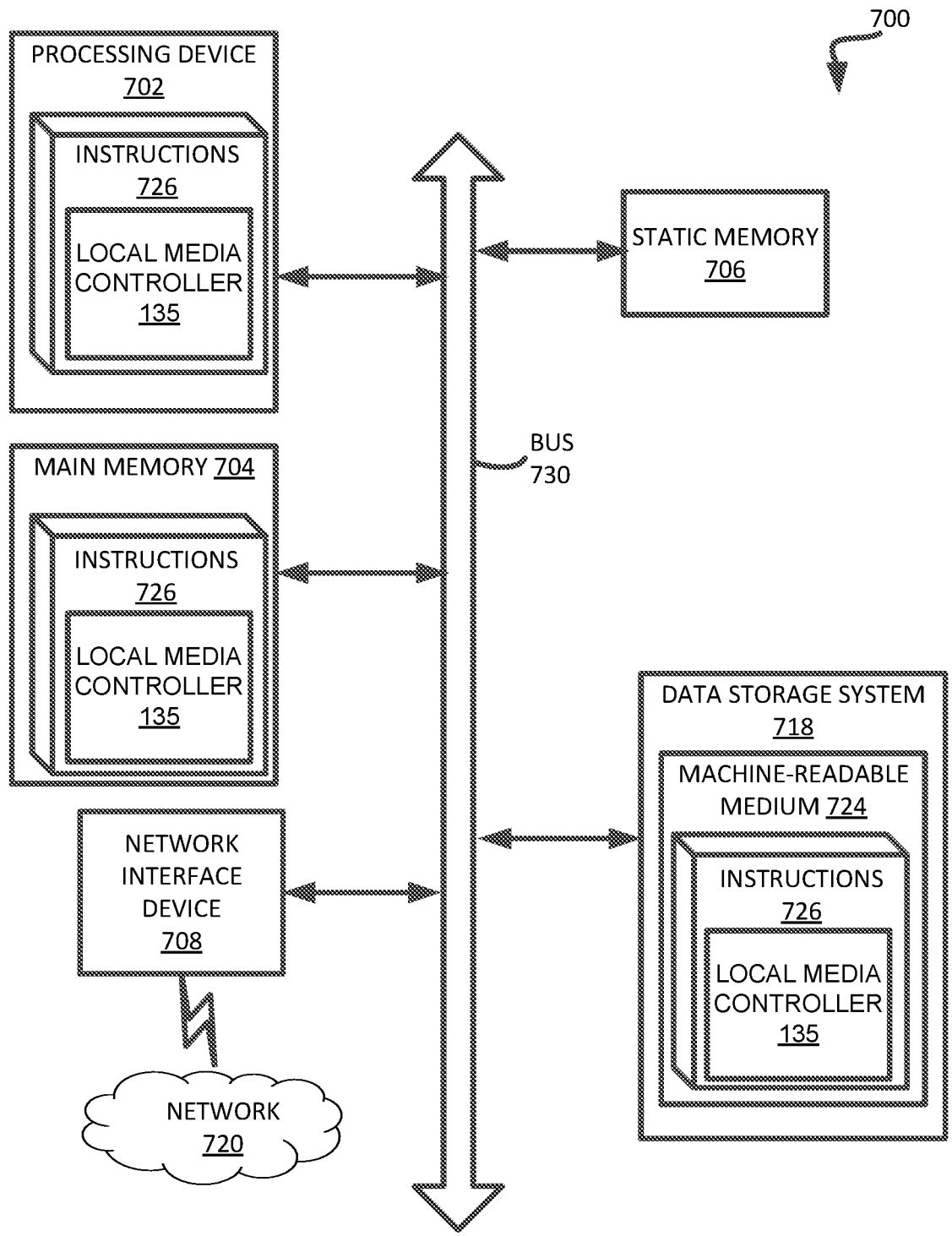
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium, such as a non-transitory computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to local media controller 135 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a memory array configured with a plurality of memory planes; and
control logic, operatively coupled with the memory array, to perform operations comprising:
performing a plurality of asynchronous memory access operations on the plurality of memory planes;
detecting an occurrence of an asynchronous interrupt event;
initiating a termination procedure for each of the plurality of asynchronous memory access operations to permit each of the plurality of asynchronous memory access operations to end at different times; and
in response to a first memory access operation of the plurality of asynchronous memory access operations ending:
asserting a command result signal, wherein the command result signal is de-asserted automatically in response to receipt of a subsequent memory access command directed to any of the plurality of memory planes; and
asserting a persistent event register signal, wherein the command result signal is de-asserted in response to receipt of a clear event register command.

2. The memory device of claim 1, wherein the command result signal and the persistent event register signal are provided to at least one of a memory sub-system controller or a host system coupled to the memory device.

3. The memory device of claim 2, wherein the persistent event register signal is to notify the at least one of the memory sub-system controller or the host system that the memory device has recovered from the occurrence of the asynchronous interrupt event and that the plurality of asynchronous memory access operations were terminated.

4. The memory device of claim 2, wherein the control logic is to perform operations further comprising:
receiving the clear event register command from the at least one of the memory sub-system controller or the host system; and
de-asserting the persistent event register signal.

5. The memory device of claim 2, wherein detecting the occurrence of the asynchronous interrupt event comprises at least one of receiving a reset command from the at least one of the memory sub-system controller or the host system, or detecting a drop in a voltage supply level of the memory device.

6. The memory device of claim 1, wherein the command result signal and the persistent event register signal are asserted based on a value stored in a device status register representing a state of the plurality of asynchronous memory access operations on each of the plurality of memory planes.

7. The memory device of claim 1, wherein performing the plurality of asynchronous memory access operations comprises performing a respective one of the plurality of asynchronous memory access operations on each of the plurality of memory planes concurrently.

8. The memory device of claim 1, wherein initiating the termination procedure for each of the plurality of asynchronous memory access operations comprises causing a respective state machine associated with a respective one of the plurality of memory planes to enter one or more states to terminate a corresponding one of the plurality of asynchronous memory access operations being performed on the respective one of the plurality of memory planes.

9. The memory device of claim 1, wherein the control logic is to perform operations further comprising:
in response to each of the plurality of asynchronous memory access operations ending, asserting a respective partition status signal indicating that a corresponding one of the plurality of memory planes is ready and able to accept a subsequent memory access command.

10. The memory device of claim 1, wherein the control logic is to perform operations further comprising:
in response to all of the plurality of asynchronous memory access operations ending, asserting a device status signal indicating that all of the plurality of memory planes are ready and able to accept subsequent memory access commands.

11. A method comprising:
performing a plurality of asynchronous memory access operations on a plurality of memory planes of a memory device;
detecting an occurrence of an asynchronous interrupt event;
initiating a termination procedure for each of the plurality of asynchronous memory access operations to permit each of the plurality of asynchronous memory access operations to end at different times; and
in response to a first memory access operation of the plurality of asynchronous memory access operations ending:
asserting a command result signal, wherein the command result signal is de-asserted automatically in response to receipt of a subsequent memory access command directed to any of the plurality of memory planes; and
asserting a persistent event register signal, wherein the command result signal is de-asserted in response to receipt of a clear event register command.

12. The method of claim 11, wherein the command result signal and the persistent event register signal are provided to at least one of a memory sub-system controller or a host system coupled to the memory device.

13. The method of claim 12, wherein the persistent event register signal is to notify the at least one of the memory sub-system controller or the host system that the memory device has recovered from the occurrence of the asynchronous interrupt event and that the plurality of asynchronous memory access operations were terminated.

14. The method of claim 12, further comprising:
receiving the clear event register command from the at least one of the memory sub-system controller or the host system; and
de-asserting the persistent event register signal.

15. The method of claim 12, wherein detecting the occurrence of the asynchronous interrupt event comprises at least one of receiving a reset command from the at least one of the memory sub-system controller or the host system, or detecting a drop in a voltage supply level of the memory device.

16. The method of claim 11, wherein the command result signal and the persistent event register signal are asserted based on a value stored in a device status register representing a state of the plurality of asynchronous memory access operations on each of the plurality of memory planes.

17. The method of claim 11, wherein performing the plurality of asynchronous memory access operations comprises performing a respective one of the plurality of asynchronous memory access operations on each of the plurality of memory planes concurrently.

18. The method of claim 11, wherein initiating the termination procedure for each of the plurality of asynchronous memory access operations comprises causing a respective state machine associated with a respective one of the plurality of memory planes to enter one or more states to terminate a corresponding one of the plurality of asynchronous memory access operations being performed on the respective one of the plurality of memory planes.

19. The method of claim 11, further comprising:
in response to each of the plurality of asynchronous memory access operations ending, asserting a respective partition status signal indicating that a corresponding one of the plurality of memory planes is ready and able to accept a subsequent memory access command.

20. The method of claim 11, further comprising:
in response to all of the plurality of asynchronous memory access operations ending, asserting a device status signal indicating that all of the plurality of memory planes are ready and able to accept subsequent memory access commands.

* * * * *